United States Patent
Hornby

(10) Patent No.: US 7,879,176 B2
(45) Date of Patent: Feb. 1, 2011

(54) METHODS OF POLYMERIC BONDING FUEL SYSTEM COMPONENTS

(75) Inventor: Michael J. Hornby, Williamsburg, VA (US)

(73) Assignee: Continental Automotive Systems US, Inc., Auburn Hills, MI (US)

( * ) Notice: Subject to any disclaimer, the term of this patent is extended or adjusted under 35 U.S.C. 154(b) by 752 days.

(21) Appl. No.: 11/806,913

(22) Filed: Jun. 5, 2007

(65) Prior Publication Data

US 2008/0029199 A1 Feb. 7, 2008

Related U.S. Application Data

(62) Division of application No. 11/014,693, filed on Dec. 20, 2004, now Pat. No. 7,374,632.

(60) Provisional application No. 60/531,206, filed on Dec. 19, 2003.

(51) Int. Cl.
*B29C 65/00* (2006.01)

(52) U.S. Cl. .............. 156/275.7; 156/272.2; 156/275.5; 156/293; 156/294

(58) Field of Classification Search ............. 156/272.2, 156/275.5, 275.7, 293, 294
See application file for complete search history.

(56) References Cited

U.S. PATENT DOCUMENTS

| | | | |
|---|---|---|---|
| 3,769,117 A | 10/1973 | Bowen et al. | |
| 4,951,878 A | 8/1990 | Casey et al. | |
| 5,150,842 A | 9/1992 | Hickey | |
| 5,159,915 A | 11/1992 | Saito et al. | |
| 5,190,223 A * | 3/1993 | Mesenich | 239/585.5 |
| 5,803,983 A | 9/1998 | Simandl et al. | |
| 5,823,445 A | 10/1998 | Sofer | |
| 5,893,959 A | 4/1999 | Muellich | |
| 5,915,626 A | 6/1999 | Awarzamani et al. | |
| 5,944,262 A | 8/1999 | Akutagawa et al. | |
| 5,996,910 A | 12/1999 | Takeda et al. | |
| 5,996,911 A | 12/1999 | Gesk et al. | |
| 6,193,833 B1 | 2/2001 | Gizowski et al. | |
| 6,290,791 B1 * | 9/2001 | Shaw et al. | 156/64 |
| 6,386,467 B1 | 5/2002 | Takeda | |
| 6,454,188 B1 * | 9/2002 | Maier | 239/533.12 |
| 6,464,153 B1 | 10/2002 | Bonnah, II et al. | |
| 6,465,757 B1 | 10/2002 | Chen | |
| 6,589,380 B2 | 7/2003 | Gnage | |
| 6,596,122 B1 | 7/2003 | Saviski et al. | |
| 6,631,857 B2 | 10/2003 | Ibrahim et al. | |
| 6,782,869 B2 | 8/2004 | Blakley | |
| 6,802,929 B2 | 10/2004 | Ruotsalainen | |
| 6,808,133 B1 * | 10/2004 | Stier | 239/585.1 |

(Continued)

*Primary Examiner*—Jeff H Aftergut
*Assistant Examiner*—Daniel McNally

(57) ABSTRACT

Methods of forming a hermetic seal between fuel system components are provided. One of the methods can be achieved by passing a light beam through a wall of a polymeric member to an inner surface of the wall that surrounds an outer surface of a polymeric body and defines an internal passage for a flow of fuel; and welding the inner surface of the polymeric member to the outer surface of the polymeric body to provide a hermetic seal at the respective inner and outer surfaces against the flow of fuel. Another method can be achieved by disposing an adhesive on an inner surface of polymeric member that surrounds an outer surface of a polymeric body and defines an internal passage for a flow of fuel; and activating the adhesive to bond the polymeric member to the polymeric body.

5 Claims, 3 Drawing Sheets

U.S. PATENT DOCUMENTS

| | | |
|---|---|---|
| 2004/0031562 A1 | 2/2004 | Kaiser et al. |
| 2004/0031777 A1 | 2/2004 | Bauer et al. |
| 2004/0112519 A1 | 6/2004 | Mori |
| 2004/0154737 A1 | 8/2004 | Chen et al. |
| 2004/0231788 A1 | 11/2004 | Chen et al. |

* cited by examiner

METHODS OF POLYMERIC BONDING FUEL SYSTEM COMPONENTS

PRIORITY

This is a division filed pursuant to 35 U.S.C. §120 and §121 and claims the benefits of prior U.S. application Ser. No. 11/014,693, filed on Dec. 20, 2004, now U.S. Pat. No. 7,374,632 which claims the benefit under 35 U.S.C. §119 based on Provisional Application Ser. No. 60/531,206, entitled "Plastic Bodied Fuel Injector", and filed on Dec. 19, 2003, which application is incorporated herein in its entirety into this specification.

BACKGROUND OF THE INVENTION

Examples of known fuel injection systems use an injector to dispense a quantity of fuel that is to be combusted in an internal combustion engine. The quantity of fuel that is dispensed is varied in accordance with a number of engine parameters such as engine speed, engine load, engine emissions, etc. The injector can be mounted to fuel rail cup, which is secured or welded to a fuel rail. The fuel rail can be provided with a fuel feed pipe and a fuel return pipe. The fuel rail can also be a returnless fuel rail provided with an internal damper. The fuel feed pipe can be connected to other pipes, which connect to a fuel pump, and fuel supply that provides fuel to the fuel injector.

Known electronic fuel injection systems monitor at least one of the engine parameters and electrically operate the injector to dispense the fuel. It is believed that examples of known fuel injectors use electromagnetic coils, piezoelectric elements, or magnetostrictive materials to actuate a valve.

A known fuel injector utilizes a plethora of internal components such as a metallic inlet tube connected to a valve body via a non-magnetic shell with a pole piece interposed therebetween. The inlet tube, valve body, non-magnetic shell and pole piece are generally affixed to each other after a closure assembly and a metering assembly are disposed in the valve body. A solenoid coil is inserted over the assembled components and the entire assembly is molded into the fuel injector.

It is believed that one known fuel injector utilizes a plastic body molded over a solenoid coil to provide a plastic inlet fuel passage with a metallic valve body being coupled to the solenoid coil.

It is believed that another known fuel injector utilizes two separate subassemblies to form the fuel injector. The first subassembly can include a complete coil assembly and electrical connector molded into an outer casing to provide a power group. The second subassembly can include an inlet tube, pole piece, non-magnetic shell valve body, closure assembly and metering assembly affixed together to form a stand alone fuel group. The two sub-assemblies are formed separately and coupled together to provide an operable fuel injector.

While the known fuel injectors are suited to the task of metering fuel, it is believed that the known fuel injectors may have certain assembly or component drawbacks that require extensive manufacturing process to be undertaken to ensure that the injector are suitable for commercial applications. They can include, for example, the necessity for multiple seal points between components to provide leak integrity in the injector and a large number of manufacturing steps that are undertaken. These seals can be effectuated by elastomeric seals, such as, O-rings, or multiple hermetic welds to ensure structural and leak integrity of the known fuel injectors. Others include the potential manufacturing difficulties associated with thermal distortion in welding multiple metallic components at close proximity to each other or the need for a metal valve body with internal resilient seals for leak integrity. Yet another drawback can include the utilization of lift setting components that must be inserted into the valve body of the fuel injector. Thus, it would be advantageous to reduce or even eliminate some of these drawbacks.

SUMMARY OF THE INVENTION

According to one aspect, the present invention provides for a method of forming a hermetic seal between fuel system components. The method can be achieved by passing a light beam through a wall of a polymeric member to an inner surface of the wall that surrounds an outer surface of a polymeric body and defines an internal passage for a flow of fuel; and welding the inner surface of the polymeric member to the outer surface of the polymeric body to provide a hermetic seal at the respective inner and outer surfaces against the flow of fuel.

According to yet another aspect, the present invention provides for a method of forming a hermetic seal between fuel system components. The method can be achieved by disposing an adhesive on an inner surface of polymeric member that surrounds an outer surface of a polymeric body and defines an internal passage for a flow of fuel; and activating the adhesive to bond the polymeric member to the polymeric body.

BRIEF DESCRIPTIONS OF THE DRAWINGS

The accompanying drawings, which are incorporated herein and constitute part of this specification, illustrate an embodiment of the invention, and, together with the general description given above and the detailed description given below, serve to explain the features of the invention.

DETAILED DESCRIPTION OF THE PREFERRED EMBODIMENTS

Figure 1:
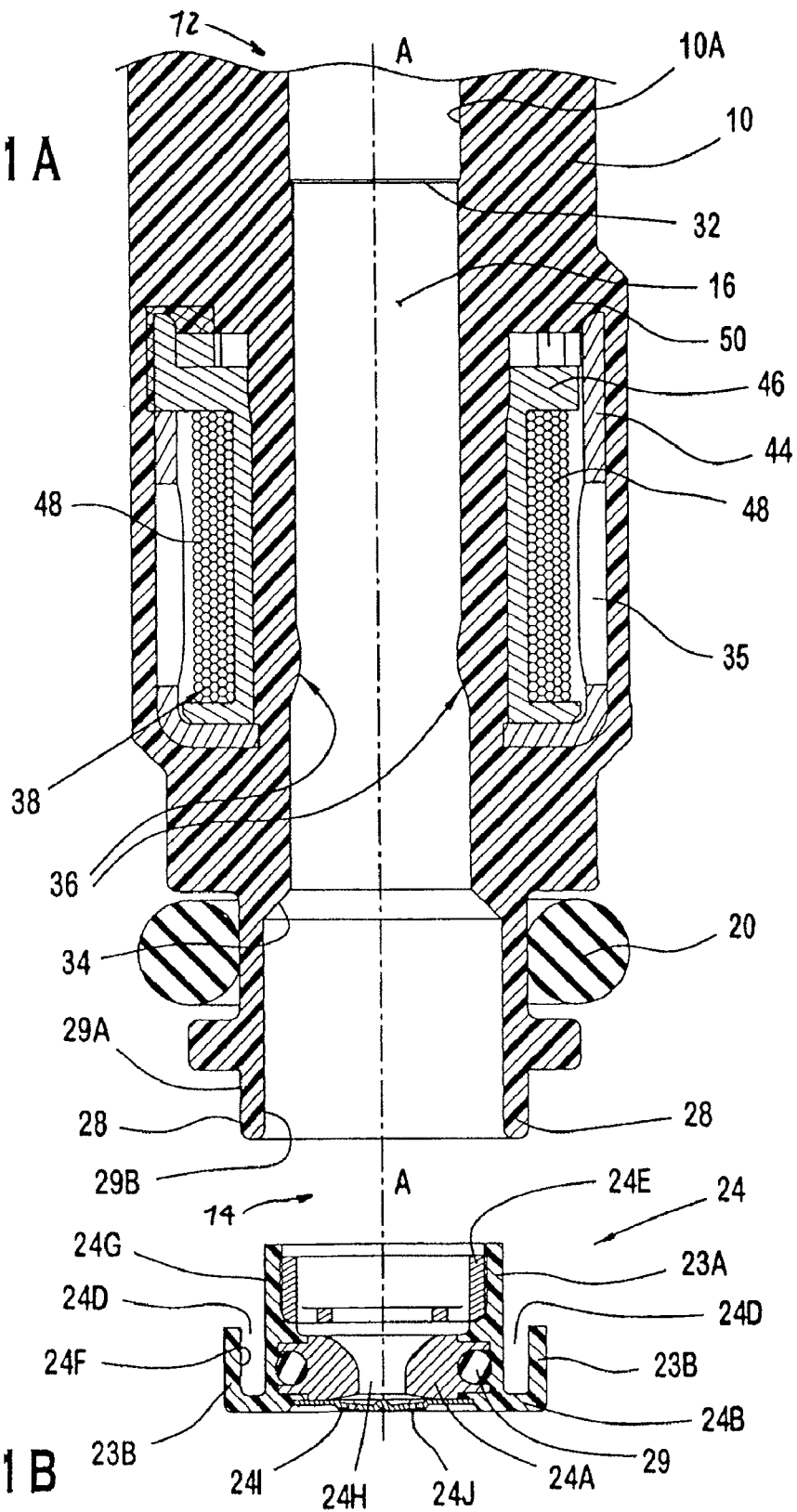
FIG. 1A is a cross-sectional illustration of a first type fuel system component according a preferred embodiment.
FIG. 1B is a cross-sectional illustration of a second type of fuel system component.
Figure 2:
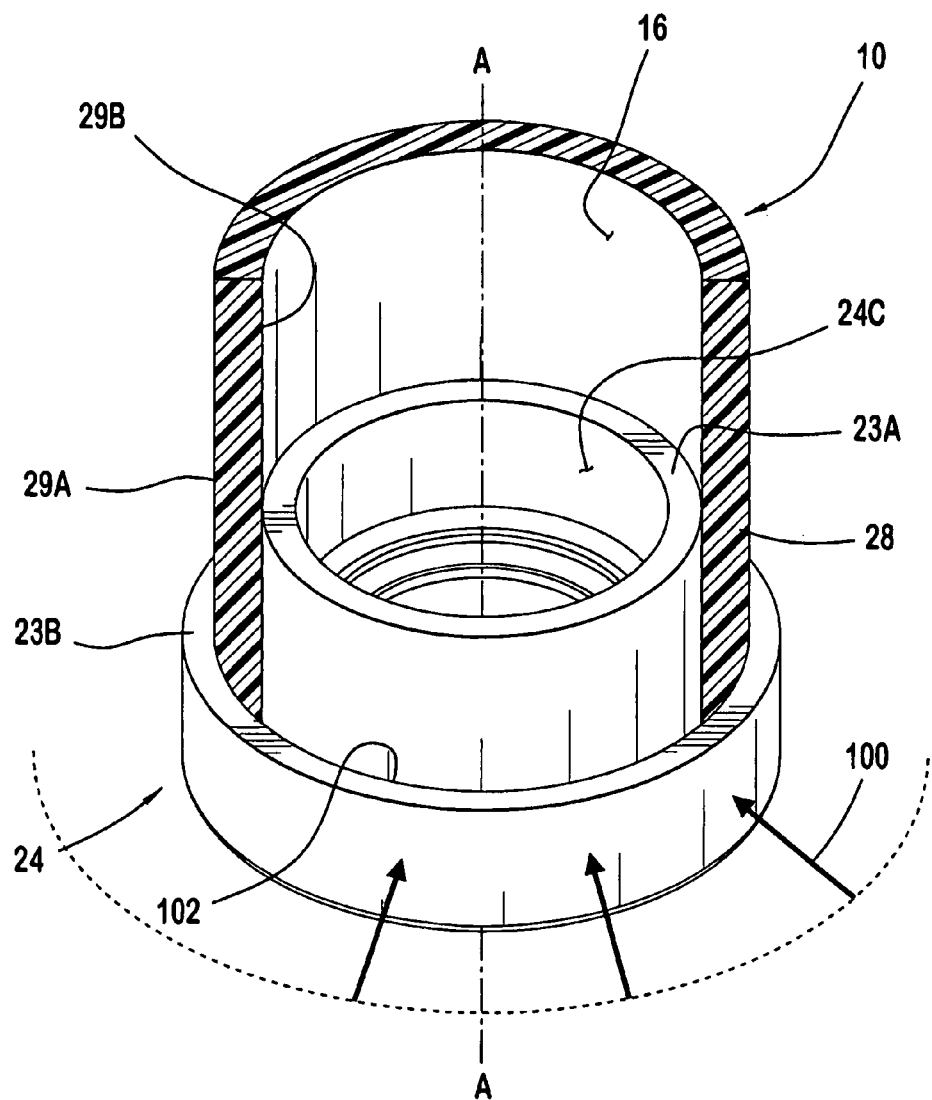
FIG. 2 is a perspective of one of the processes of polymeric bonding the fuel components of FIGS. 1A and 1B to form a hermetic seal.
Figures 3A, 3B:
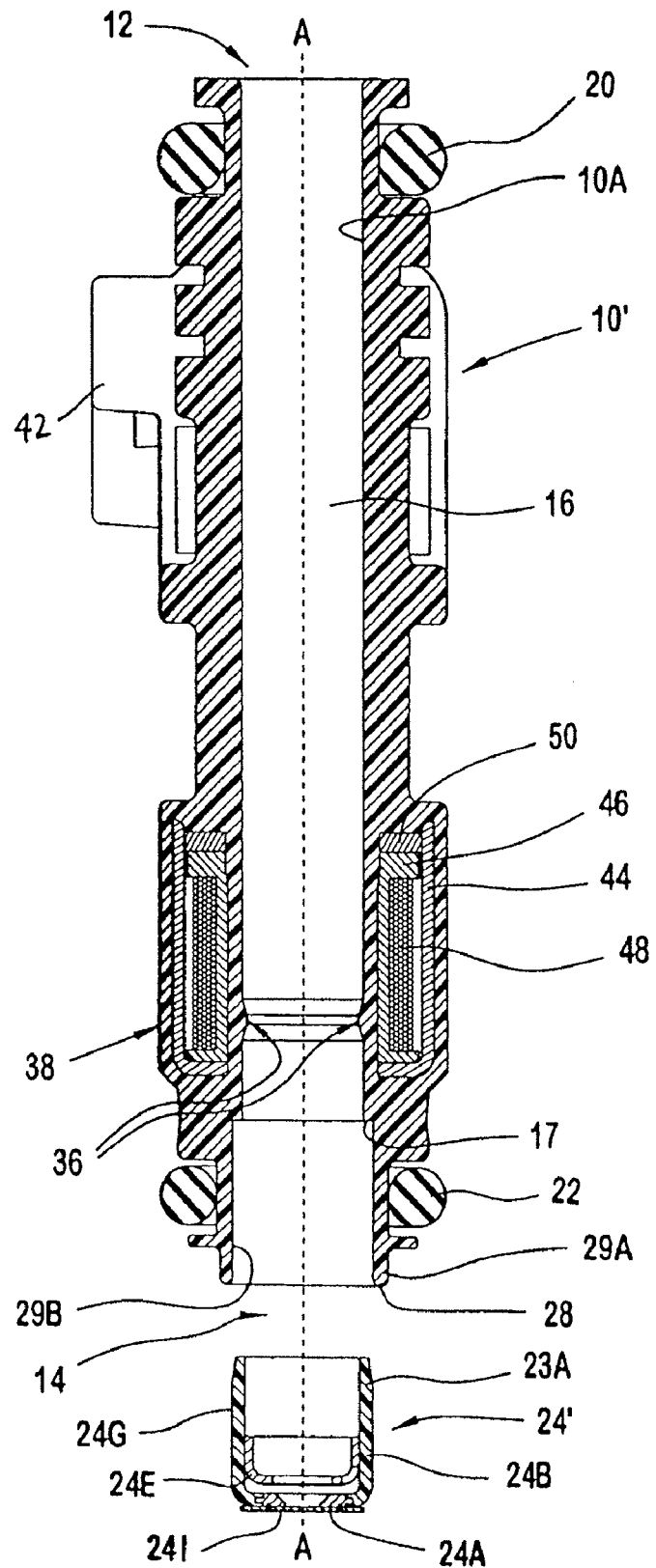
FIG. 3A illustrates a cross-sectional view of a variation of the first type of fuel system component.
FIG. 3B illustrates a cross-sectional view of a variation of the second type of fuel system component.

FIGS. 1-3 illustrate the preferred embodiments of two fuel system components 10 (or 10') and 24 (or 24') that can be affixed together in accordance with a preferred method described herein to provide a partially assembled fuel injector. Referring to FIGS. 1-3, a fuel injector housing includes a continuous polymeric body 10 extending from an inlet 12 to an outlet 14 along a longitudinal axis A-A. As best shown in FIG. 3A, the polymeric body 10 includes a polymeric wall surface 10A that directly faces the longitudinal axis A-A to define a first passage 16 in which fuel can flow from the inlet 12. The first passage 16 includes the polymeric bore 10A that extends from a first external seal 20 proximate the inlet 12 to a second external seal 22 proximate an outlet 14 along the longitudinal axis A-A. Disposed within a portion of the polymeric bore 10A is a metering assembly 24 (or 24') proximate the second external seal 22.

The first passage 16 can be provided with a plurality of stepped surfaces 32, 34 (FIG. 1A) defining a plurality of diameters for the polymeric bore 10A. The polymeric bore 10A can also include an inward (i.e., towards the longitudinal axis A-A) surface to define a guide surface 36 for a reciprocable closure member. The inward surface preferably includes a tapered surface 36. The polymeric body can be formed from a suitable polymeric material such as, for example, Nylon 6-6 with about 30 percent glass filler. The housing 10 can include a closure assembly is disposed proximate the metering assembly 24 (or 24'), which is coupled to a rim portion 28 at the outlet end 14 of the polymeric body 10. For brevity, details of components inside the housing 10 are not shown. Instead, details of these components are disclosed in copending application entitled "Polymeric Fuel Injector," Ser. No. 11/014,694, which is incorporated herein by reference in its entirety into this application.

As shown in FIGS. 1A and 3A, the polymeric body 10 (or 10') provides a complete solenoid coil subassembly 38 that is ready for assembly with the metering and closure assemblies. In particular, the polymeric body 10 includes a solenoid coil assembly 38 disposed within the polymeric body 10 so that no part of the coil assembly 38 extends outside the boundary of the polymeric body 10. The solenoid coil assembly 38 is connected to at least one electrical terminal (not shown) formed on an electrical connector portion 42 (FIG. 3A) of the polymeric body 10. The terminal and the electrical harness connector portion 42 can engage a mating connector, e.g., part of a vehicle wiring harness (not shown), to facilitate connecting the injector 10 (or 10') to an electrical power supply (not shown) for energizing the electromagnetic coil 48.

The coil assembly 38 includes a coil housing 44 disposed about the longitudinal axis A-A to surround a bobbin 46 and at least one wire coiled about the bobbin 46 to form an electromagnetic coil 48. The coil housing 44, which provides a return path for magnetic flux, generally takes the shape of a ferro-magnetic cylinder surrounding the electromagnetic coil 48. A flux washer 50 can abut a top surface of the bobbin 46 so that the flux washer 50 is in physical contact with the coil housing 44. The flux washer 50 can be integrally formed with or separately attached to the coil housing 44. The coil housing 44 can include holes, slots, or other features to break up eddy currents, which can occur when the coil 48 is de-energized.

The coil assembly 38 can be preferably constructed with the housing 10 (or 10') as follows. A plastic bobbin 46 is molded with at least one electrical contact extending from the bobbin 46 so that the peripheral edge of the contact can be mated with a contact terminal for electrical communication between the coil and a power source. A wire for the electromagnetic coil 48 is wound around the plastic bobbin 46 a predetermined number of times and connected to the at least one electrical contact portion. The electromagnetic coil 48 (with bobbin 46) is placed into the coil housing 44. An electrical terminal (not shown), which is pre-bent to a desired geometry, is then electrically connected to each electrical contact portion provided on the bobbin 46. Thereafter, the polymeric body 10 (or 10') can be formed by a suitable technique such as, for example, thermoset casting, compression molding or injection molding. The polymeric body 10 (or 10'), e.g., an overmold, provides a structural casing for the injector 10 (or 10') and provides predetermined electrical and thermal insulating properties. In a preferred embodiment, the polymeric body 10 (or 10') is formed by injection molding around the coil assembly 38 and the electrical connector 42, i.e., an insert-molding so that the metering assembly can be affixed to the polymeric body 10 (or 10'). The insert-molding hermetically seals the coil assembly 38 from contamination with fuel flow through the polymeric fuel passage 16.

Referring to FIGS. 1B and 3B, the metering assembly 24 (or 24') includes a seat 24A that can be any suitable material such as, for example, plastic, ceramic or metal, long as it provides a suitably sealing surface. In the preferred embodiments, the seat 24A is formed of metallic material, and is secured to a polymeric support member 24B. A metering disc 24I is secured to the metallic seat 24A or to the support member 24B. As shown in FIG. 2, the support member 24B includes a first pocket 24C defined by a cylindrical portion 23A to receive a cup-shaped guide member 24E. The cup-shaped guide member 24E can be formed from a suitable material such as, for example, polymeric, ceramic or metallic. Preferably, the guide member 24E is stamped metallic member press-fitted into the first pocket 24C to a predetermined location with respect to the seat 24A via a boss extension formed in the first pocket 24C. The cup-shaped guide member 24E includes an aperture disposed about the longitudinal axis A-A and at least one aperture offset with respect to the longitudinal axis A-A. The support member 24B also includes a second pocket 24D defined by an annular cylindrical portion 23B. The second pocket 24D is configured to receive the rim portion 28 of the outlet end 14 of the polymeric body 10 (or 10'). Preferably, the second pocket 24D is configured so that at least a locational clearance fit to a light press-fit is formed between the rim portion 28 of the polymeric body 10 (or 10') and the inner wall surface 24F of the annular cylinder 23B and the outer surface 24G of the inner cylinder of the first pocket 24C. The metallic seat 24A can be provided with the polymeric support member 24B by a suitable technique such as, for example, insert molding the metallic seat 24A with a suitable polymeric material. In the preferred embodiments, the material used for the polymeric body 10 (or 10') and bobbin 46 can be Nylon 6-6 with about 30% by weight glass filler with BASF®. Ultramid A3WG6LT as the material for the polymeric support member 24B. Alternatively, the material used for the bobbin 46 and support member 24B is Nylon 6-6 with about 30% by weight glass filler with BASF®. Ultramid A3WG6LT as the material for the housing 10 (or 10').

The metallic seat 24A defines a seat orifice 24H generally centered on the longitudinal axis A-A and through which fuel can flow into the internal combustion engine (not shown). The seat 24A includes a sealing surface surrounding the seat orifice 24H. The sealing surface, which faces the interior of polymeric bore 10A, can be frustoconical or concave in shape, and can have a finished or coated surface. A metering disc 24I can be used in connection with the seat 24A to provide at least one precisely sized and oriented metering orifice 24J in order to obtain a particular fuel spray pattern. The precisely sized and oriented metering orifice 24J can be disposed on the center axis of the metering disc 24I or, preferably, the metering orifice 24J can disposed off-axis, and oriented in any desirable angular configuration relative to one or more reference points on the fuel injector 10 (or 10'). Preferably, the metallic seat 24A is a stainless steel seat.

In the preferred embodiments, the fuel system components 10 (or 10') and 24 (or 24') can be hermetically secured together by utilizing a polymeric fuel injector housing 10 (or 10') with an insert-molded solenoid coil assembly 38, as shown in FIG. 1A. The metering assembly 24, as shown in FIG. 1B, is fitted onto the rim portion 28 of the outlet 14 of the polymeric body 10 (or 10'). These components can be bonded to each other by a suitable technique such as, for example, UV light activated adhesive, thermal bonding, or laser welding to form a hermetic seal HW.

The process of hermetically bonding one fuel component 10 (or 10') to another component 24 (or 24') can be achieved by disposing an adhesive on at least a surface 24F or 24G of the polymeric support member 24 (or 24') contiguous to a surface 29A or 29B of the polymeric body 10 (or 10'); and activating the adhesive to bond the support member 24 (or 24') to the housing 10 (or 10'). The adhesive can be a suitable adhesive such as, for example, epoxy type, acrylate or urethane acrylate type adhesive. Where the adhesive is an ultraviolet ("UV") light activated adhesive, one of the polymeric support member 24B or at least a portion of the polymeric body 10 can be a polymer substantially transparent to UV-light so that exposure of the adhesive to UV-light between the two components will cause the components to bond to each other hermetically.

In the preferred embodiments, the metering assembly 24 is affixed to the outlet by a suitable structural adhesive. More preferably, the metering assembly 24 is affixed proximate the outlet 14 of the body 10 via laser plastic welding.

In the preferred embodiments, the metering assembly 24 (or 24') is affixed proximate the outlet 14 of the housing 10 via a laser polymeric welding process. The welding process for the two components can be achieved as follows. The metering assembly 24 (or 24') is assembled onto the housing 10 with a suitable fit (e.g., light press-fit or locational press-fit). In the preferred embodiments, the fit is a light press-fit to reduce the availability of trapped air between the two components or provide physical contact between the two components. As shown in FIG. 2, a suitable radiant energy beam 100 is passed through the cylindrical wall 23B to the inner surface 24F, at which point the outer surface 29A of the rim portion 28 begins to melt under radiant energy beam (FIGS. 1A and 1B). The melting of the outer surface 29A is believed to cause the inner surface 24F to also begin melting, which leads to a fused portion of polymeric materials provided by the outer surface 29A and inner surface 24F. As the components and the radiant energy source are rotated relative to each other, the fused portion forms a continuous seam 102, which provides a hermetic seal at the interface of the outer surface 29A and inner surface 24F against a flow of fuel in the polymeric bore 16.

In the alternative preferred embodiment of FIGS. 3A and 3B, the metering assembly 24' is inserted into the polymeric bore 16, which can be provided with a step portion 17 to prevent over-insertion of the assembly 24'. A radiant energy source 100 is passed through the rim 28 to the inner surface 29B, at which point the outer surface 24G of the cylindrical wall 23A begins to melt. The melting of the outer surface 24G causes the inner surface 29B to also begin to melt, which leads to a fused portion of polymeric materials provided by the outer surface 24G and inner surface 29B. As the components and the radiant energy source are rotated relative to each other, the fused portion forms a continuous seam 102, which provides a hermetic seal at the interface of the outer surface 24G and inner surface 29B against a flow of fuel in the polymeric bore 16.

The components 10 (or 10') and 24 (or 24'), as a unitary unit, can be rotated at a desired rotation speed for about 360 degrees relative to the radiant energy source and preferably 405 degrees to provide a continuous seam 102 of welded polymeric materials, which are melted together from the components 10 (or 10') and 24 (or 24'). In the preferred embodiment, the components 10 (or 10') and 24 (or 24') are rotated together at about 400 revolutions per minute with the radiant energy source being provided continuously over a rotation of about 400 degrees so that a continuous seam 102 circumscribes the longitudinal axis A-A.

The laser polymeric bonding can be performed using a suitable polymeric material such as, for example, thermoplastics (e.g., polyolefin's, polyamides, polyformaldehyde, polypropylene, polyvinylidenflouride (PVDF), PMMA, PBT, PBT,) or nylon materials. One fuel system component can be formed by one type of polymeric material while the other fuel component can be of another type of polymeric material. The one type of material can be selected to be generally transparent to a suitable electromagnetic frequency such as that provided by a Nd:YAG laser. The term "transparent" indicates that the one type of material can have a light transmission of at least 60% and a light absorption of less than 30% with reflectivity of less than 20% at the selected electromagnetic radiation frequency or range of electromagnetic radiation frequencies. The other type of material can be selected to be generally opaque to a suitable electromagnetic radiation frequency. The term "opaque" indicates that the material has an absorption of more than 70% with negligible light transmission and where applicable, a reflectivity of less than 10% at the selected electromagnetic radiation frequency or range of electromagnetic radiation frequencies. Fillers or additives can be provided for enhancing physical properties of the polymeric material. Light absorbing material can be used for each component to ensure sufficient absorption of light energy. The light absorbing material can be carbon black, ink, paint or a suitable layer of opaque material. Alternatively, both components 10 (or 10') and 24 (or 24') can be of the same polymeric material with one of the components provided with a light absorbing filler or coating. Preferably, Nylon 6-6 with about 30% by weight glass filler can be used with both fuel system components with one component having being a laser transparent nylon material. More preferably, a Nylon 6-6 material made by BASF® under the trade name Ultramid A3WG6LT can be used as a generally transparent material to collimated electromagnetic radiation, such as, for example, a laser source.

Any laser source can be used as long as the laser source provides the ability to deliver energy to a selected one of the polymeric member or body. The laser light source can be a solid-state laser, a copper vapor laser, a Neodymium:Vanadate (Nd:VAN) laser, or a frequency doubled Neodymium: Yttrium-Aluminum-Garnet (Nd:YAG) laser having a wavelength from 400-1100 nanometers with a power output of at least 25 Watts. Preferably, the laser source is continuous output Neodymium:Yttrium-Aluminum-Garnet (Nd:YAG) laser with a power output of 100 Watts at a wavelength of about 500 nanometers.

Details of the preferred embodiments are also described in the following copending applications: (1) "Polymeric Bodied Fuel Injector," Ser. No. 11,014,694; (2) "Polymeric Bodied Fuel Injector With A Valve Seat And Elastomeric Seal Molded To A Polymeric Support Member" Ser. No. 11/895, 476; (3) "Fuel Injector With A Metering Assembly Having A Seat Molded to A Polymeric Support Member," Ser. No. 11/014,691; (4) "Fuel Injector With A Metering Assembly Having At Least One Annular Ridge Extension Between A Valve Seat and A Polymeric Valve Body," Ser. No. 11/014, 699; (5) "Fuel Injector With An Armature Assembly Having A Continuous Elongated Armature And A Metering Assembly Having A Seat And Polymeric Support Member," Ser. No. 11/014,698; (6) "Fuel Injector With A Metering Assembly Having A Seat Secured To Polymeric Support Member Having A Surface Surrounding A Rim Of A Polymeric body And A Guide Member Disposed In The Polymeric Support Member," Ser. No. 11/014,697; (7) "Fuel Injector With A Metering Assembly Having A Polymeric Support Member Which Has An External Surface Secured To A Bore Of A Polymeric body And A Guide Member That Is Disposed In The Polymeric Support Member," Ser. No. 11/014,696; (8) "Fuel Injector With A Metering Assembly With A Polymeric Support Member And An Orifice Disk Positioned A Terminal End Of The Polymeric body," Ser. No. 11/014,695; and (9) "Method of Manufacturing Polymeric Fuel Injectors," Ser. No. 11/015,032, which are incorporated herein by reference in their entireties into this application.

Although the preferred embodiments are described in relation to a fuel injector housing and a metering assembly, the disclosure provided herein is also applicable to any other fuel system components such as, for example, a fuel rail, pressure regulator, fuel rail cups or fuel piping.

While the present invention has been disclosed with reference to certain embodiments, numerous modifications, alterations and changes to the described embodiments are possible without departing from the sphere and scope of the present invention, as defined in the appended claims. Accordingly, it is intended that the present invention not be limited to the described embodiments, but that it has the full scope defined by the language of the following claims, and equivalents thereof.

What I claim is:

1. A method of forming a hermetic seal between fuel system components comprising:

disposing an adhesive on at least an inner surface of polymeric support member that surrounds an outer surface of a polymeric body and defines an internal passage for a flow of fuel; and activating the adhesive to bond the polymeric member to the polymeric body, wherein the method further comprises providing a solenoid coil assembly as part of the polymeric body, the polymeric body including a continuous polymeric bore that extends from a first external seal proximate an inlet to a second external seal proximate an outlet of the bore along a longitudinal axis, the polymeric bore including a polymeric fuel inlet passage directly facing the longitudinal axis to permit fuel flow through the fuel inlet passage.

2. The method of claim 1, wherein the providing comprises molding a seat as part of the polymeric member, the polymeric member including a first cylinder surrounding a second cylinder to define an annular pocket disposed about a central pocket.

3. The method of claim 2, wherein the outlet comprises a rim portion disposed in the annular pocket.

4. The method of claim 1, wherein the activating comprises passing a light through one of the surface of the polymeric support member or the surface of the polymeric body to activate the adhesive.

5. The method of claim 1, wherein the method further comprises molding a seat as part of the polymeric member, the polymeric member including a cylinder disposed about a longitudinal axis.

* * * * *